United States Patent [19]

Easley, Jr. et al.

[11] 4,411,705

[45] Oct. 25, 1983

[54] FOR REMOVING PARTICLES FROM A TUBE BY MEANS OF A MISSILE

[75] Inventors: Othel D. Easley, Jr., Houston; John T. Wooten, Crosby, both of Tex.

[73] Assignee: Reactor Services International, Inc., Alvin, Tex.

[21] Appl. No.: 318,274

[22] Filed: Nov. 4, 1981

[51] Int. Cl.³ .............................................. B08B 9/02
[52] U.S. Cl. .................................... 134/8; 134/22.12
[58] Field of Search ..................... 134/8, 22.11, 22.12, 134/24, 7, 21; 15/3.5, 3.51, 95

[56] References Cited

U.S. PATENT DOCUMENTS

| 1,311,866 | 8/1919 | Armstrong | 134/24 X |
|---|---|---|---|
| 2,254,848 | 9/1941 | Holveck | 134/24 X |
| 2,321,885 | 6/1943 | Allen | 134/24 |
| 3,139,704 | 7/1964 | McCune | 15/3.5 X |
| 3,485,671 | 12/1969 | Stephens | 15/3.5 X |
| 3,631,555 | 1/1972 | Hurst et al. | 15/3.5 |
| 3,654,143 | 4/1972 | Kodera et al. | 134/22.12 X |
| 3,850,692 | 11/1974 | Allman et al. | 134/8 |
| 4,297,147 | 10/1981 | Nunciato et al. | 134/8 X |

Primary Examiner—Richard V. Fisher

[57] ABSTRACT

A method of emptying tubes containing particles includes the steps of propelling missiles up the tube, striking and dislodging the particles, causing the particles and missiles to fall out of the bottom of the tube into a receptacle from which they are removed by vacuum. A gas controlled, gas activated missile loading and firing apparatus for firing burst of missiles into one or more tubes is used to dislodge and empty the particles contained therein.

10 Claims, 16 Drawing Figures

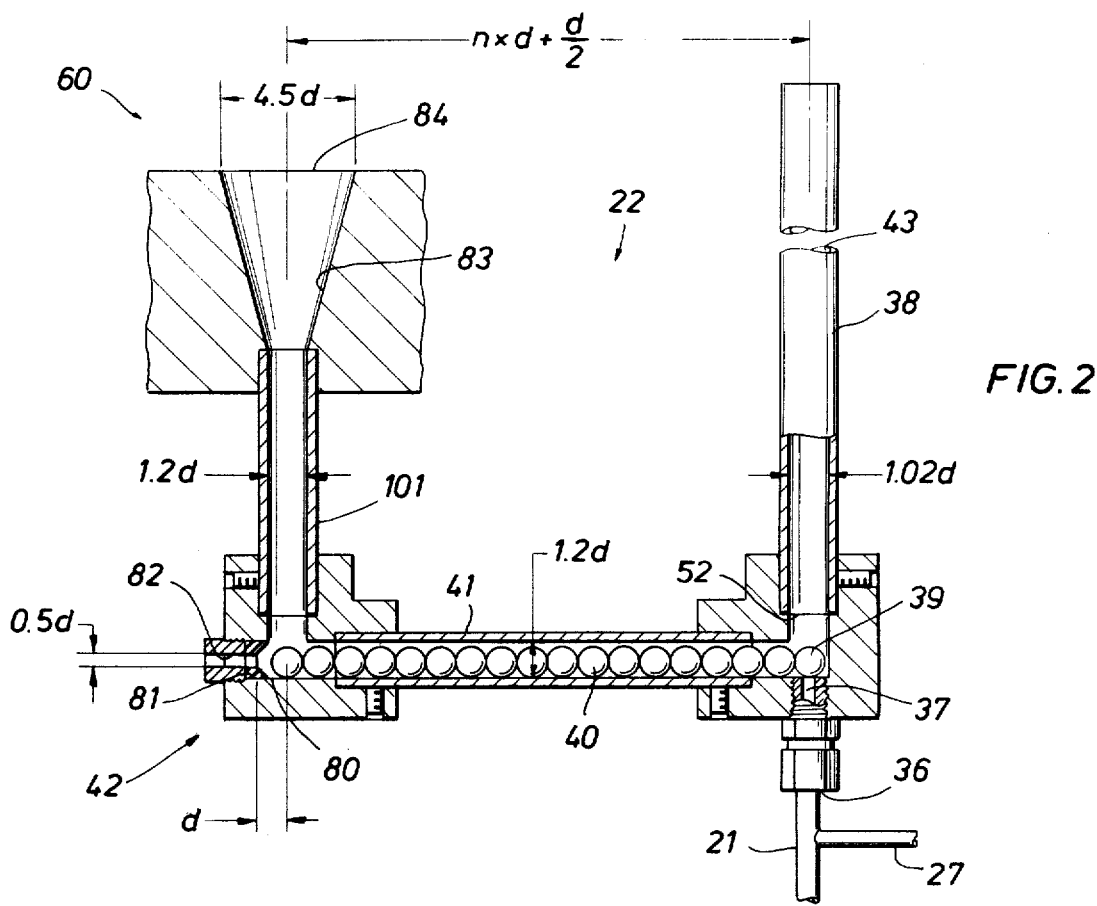

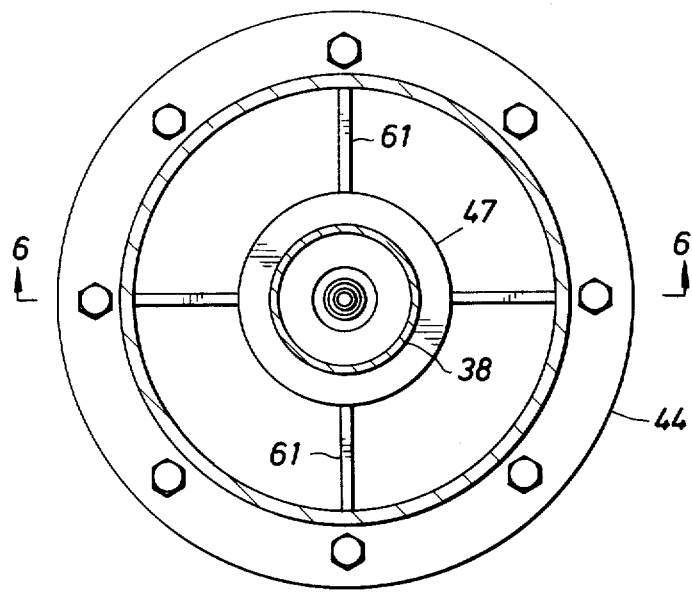
FIG. 5
FIG. 6
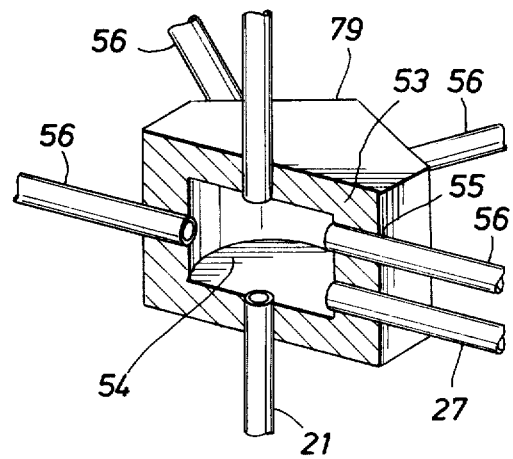
FIG. 8

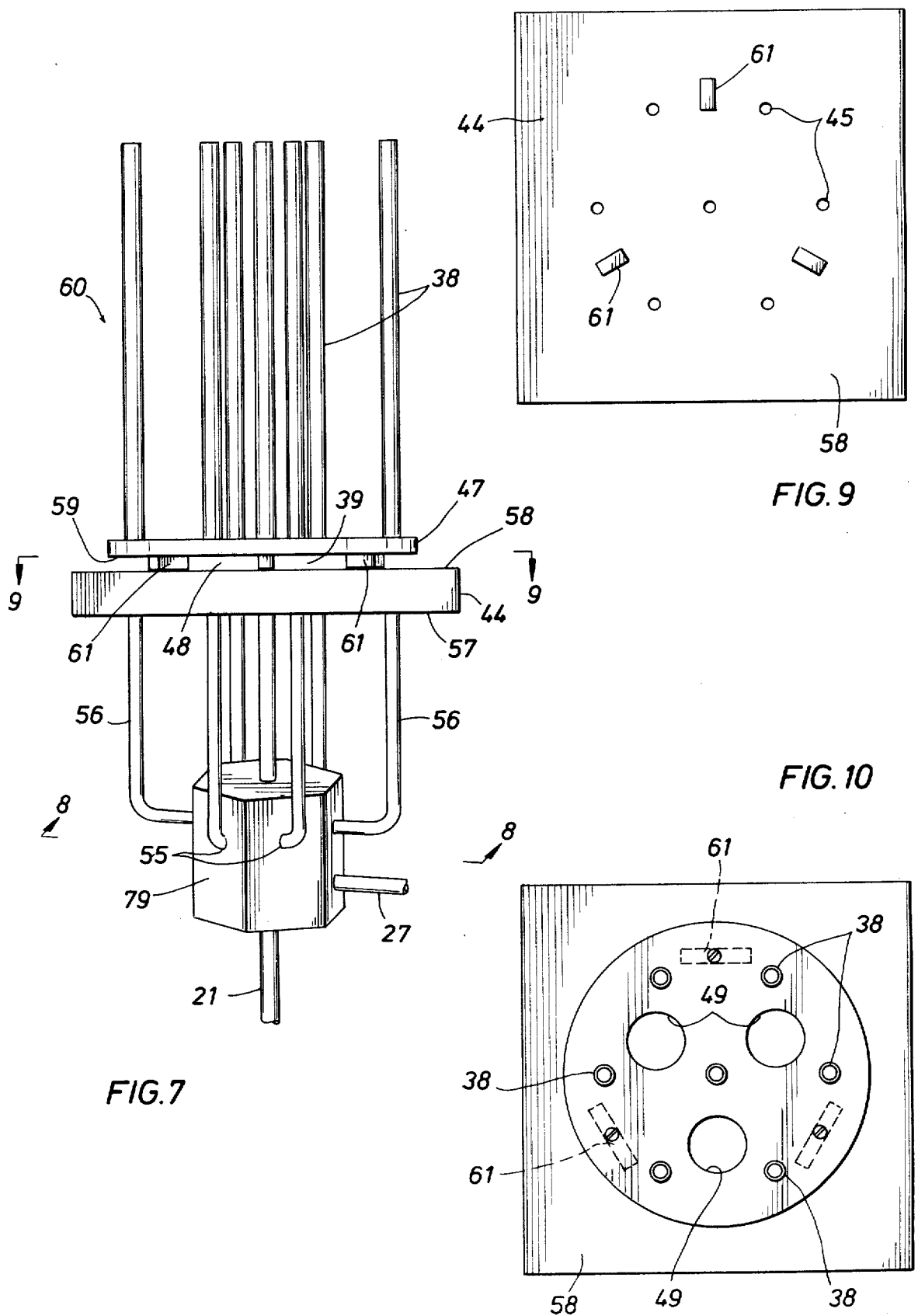

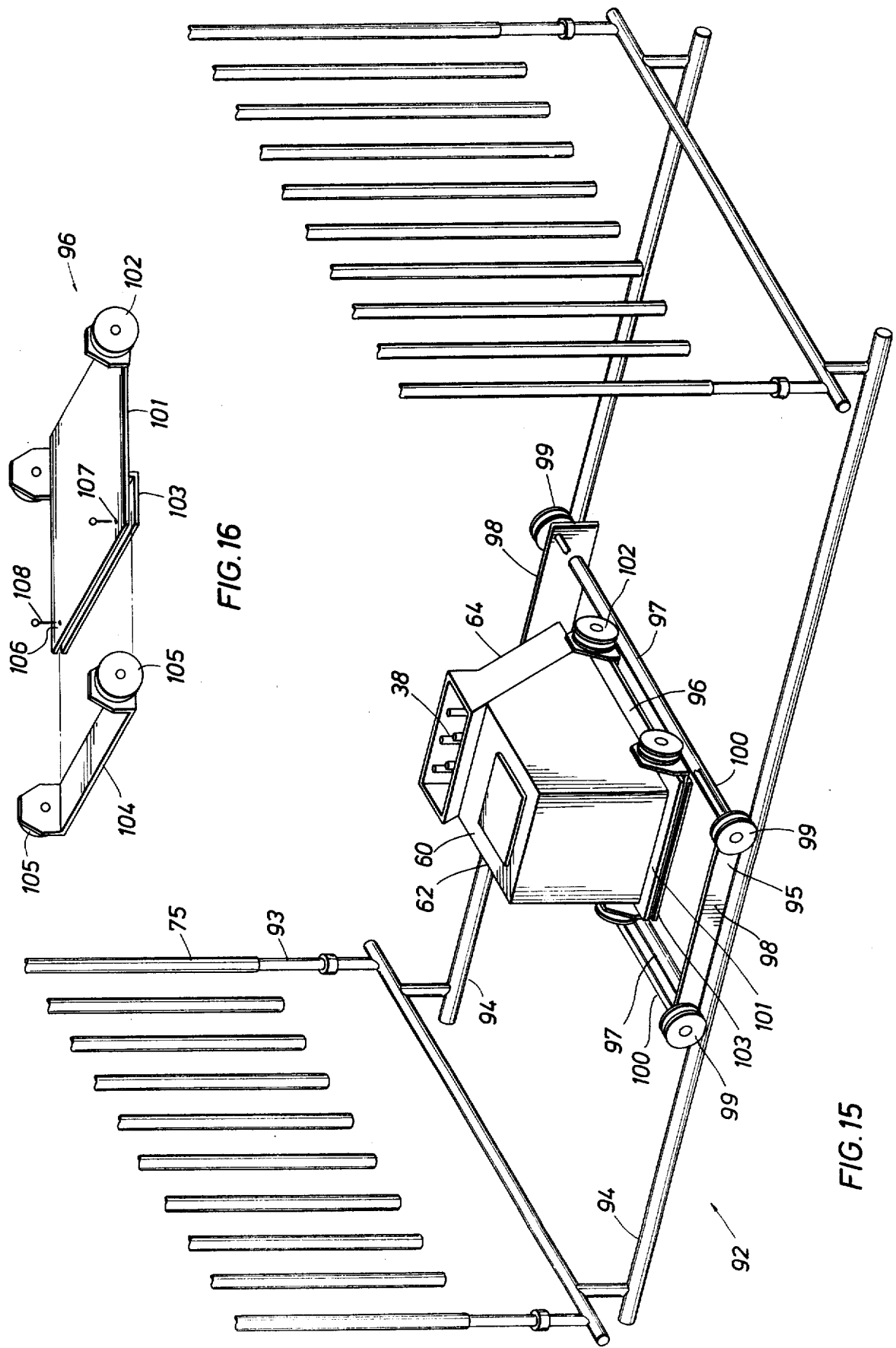

FOR REMOVING PARTICLES FROM A TUBE BY MEANS OF A MISSILE

BACKGROUND OF THE INVENTION

Tube reactors are used in many industrial applications. This is especially true in the petrochemical industries. These reactors are often multi-tube reactors where the reactor is composed of a metal shell in which there is an entrance leading to an initial tube sheet, through which many tubes penetrate and are held in place, an exit tube sheet through which the other end of the same tubes penetrate and are held in place. The tubes usually lead into an exit portion of the reactor. In most reactors catalysts are packed into the tubes, and a cooling or heating medium, i.e., gases or liquids, is circulated between the tube sheets around the outside of the tubes to control the temperature inside the tubes, while the reactants are passing through the tubes, over the catalyst.

In most instances the catalyst will lose activity, become inactive or less active, and must be replaced. But first, the spent catalyst in the tubes must be removed and, currently there is no easy process. The usual method involves using a long, flat wire, tape or tube combined with air blasts and/or vacuum and tapping on the tubes. Each tube of the reactor, when often a reactor will have hundreds, maybe thousands of tubes, often in excess of thirty-five feet long, is manually poked with the rod or wire, usually from the bottom, until all of the catalyst has fallen from a tube. Typically, the workman feeds the tape or tube into a tube and continuously tickles the catalyst, repeatedly loosening the catalyst only to have it bridge every few inches or feet below the last stationary point until all of the catalyst has fallen from a tube. Once this is completed for one tube, the workman repeats this process on the next tube until all of the tubes are empty.

It is a slow, tedious process, requiring the workman or workmen to work long hours in a cramped, dusty, often hostile environment.

The present invention is a method of emptying the tubes (of a reactor) and an apparatus for doing same which is faster, requires less manpower and may even be performed without the use of men in the reactor.

SUMMARY OF THE INVENTION

The invention relates to a method of removing catalyst or particles from tubes by propelling a missile up the tube, striking the exposed catalyst or particles causing the particles to fall within the tube, and repeating the above operation until all or almost all of the catalyst or particles packed in the tube have fallen out of the bottom of the tube. The invention relates to a method of removing catalyst or particles from a tube where bursts of missiles are propelled or fired up the tube, each burst preferably being a series of missiles fired in rapid succession, striking the catalyst or particles causing part of same to fall down the tube until the particles exit the bottom. The process of this invention relates to a method of removing particles from a tube, by repeatedly firing bursts of missiles, each burst being at least two missiles fired in apid succession, until all or nearly all of the catalyst or particles have fallen from the bottom of the tube. The invention further relates to a method of emptying a plurality of tubes containing particles by positioning an apparatus having more than one missile firing barrel so that each barrel is below a tube and firing bursts of missiles consisting of at least two missiles up into each tube until the catalyst or particles have been dislodged and fallen out of the bottom of the tubes. The invention relates to a process of dislodging particles from a tube by propelling missiles up into the tubes where the dislodged catalyst particles are collected by a stream of gas, preferably a vacuum system. The invention relates to an apparatus having at least one barrel capable of being positioned below a tube where spherical missiles are propelled up the barrel into the tube by gas pressure. The invention relates to an apparatus for firing bursts of spherical pellets. The invention relates to an apparatus for loading and delivering particles, where the loading chamber has a diaphragm which moves to agitate and induce flow of the particles.

BRIEF DESCRIPTION OF THE DRAWINGS

FIG. 2 shows a side view of a single barrel delivery unit of a tube shooting apparatus where the missiles are fed into the loading chamber from one direction.

FIG. 3 shows another embodiment of a delivery unit set inside a missile bin.

FIG. 4 is the delivery unit of FIG. 3 bisected along lines 4—4.

FIG. 5 is another embodiment of a delivery unit, viewed from the top.

FIG. 6 is the delivery unit of FIG. 5 cut along line 6—6.

FIG. 7 is a side view of a multi-barrel delivery unit of a tube emptying apparatus.

FIG. 8 is the gas distributor of the multi-barrel delivery unit of FIG. 7 cut along line 8—8.

FIG. 9 is a top view of the bottom portion of FIG. 7 cut along line 9—9.

FIG. 10 is a top view of the multi-barrel delivery unit of FIG. 7 with a particular placement of the missile flow promoters.

FIG. 15 is a view of the tube emptying apparatus in the reactor, cut away to show the apparatus supporting rack and moving unit.

FIG. 16 is a side view of the tray shown in FIG. 15.

DESCRIPTION OF THE PREFERRED EMBODIMENTS

Figure 1:
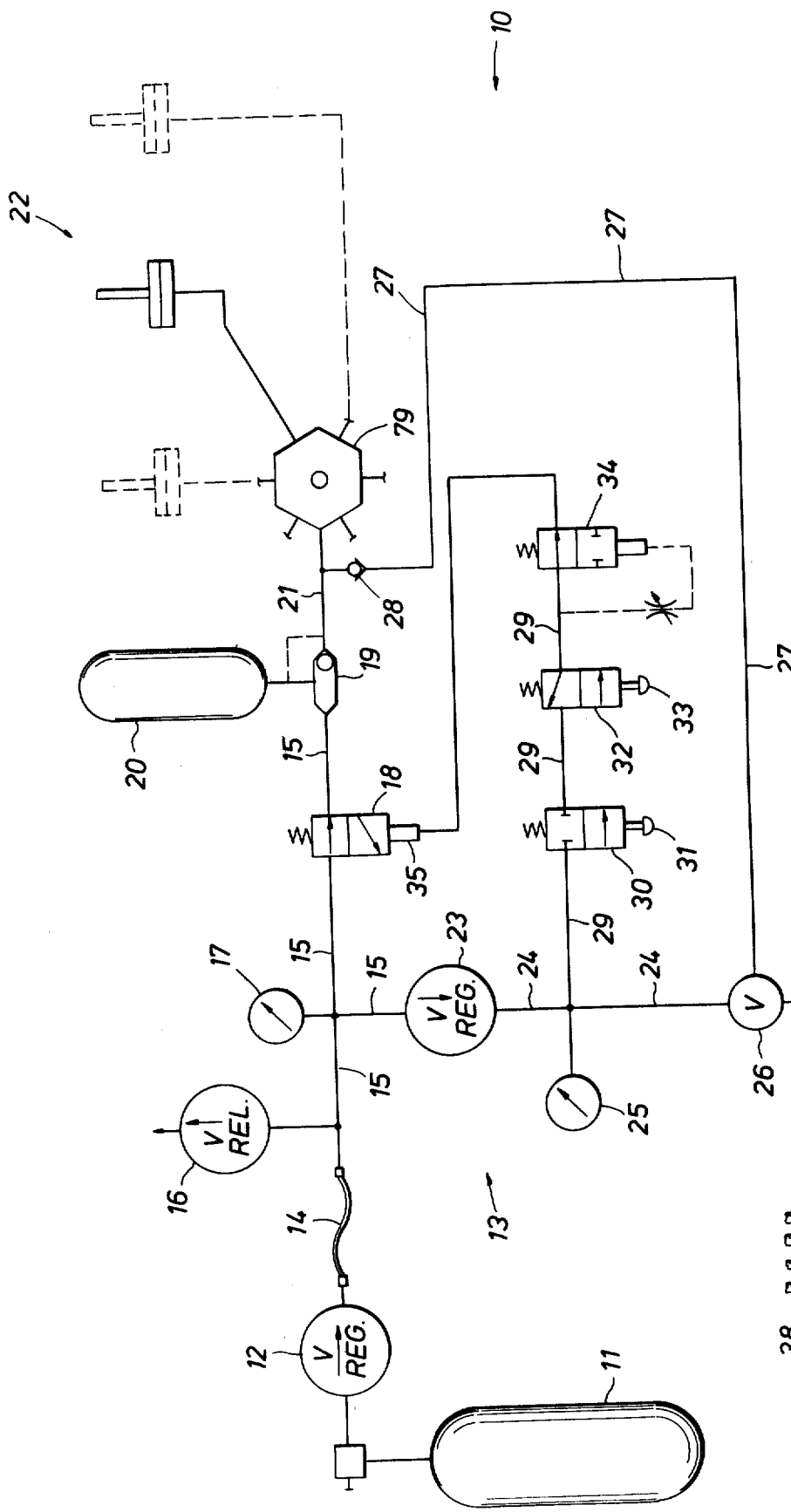
FIG. 1 shows a schematic drawing of an air operated and controlled tube emptying apparatus.

A preferred embodiment of the method of this invention shall be described in terms of emptying the tubes of a chemical or petroleum reactor, but the method would apply to emptying any tube or tube like container containing particles. In most reactors the catalyst is held in the tube by a porous stop, a spring for example, to prevent the catalyst from falling out of the tubes. The first step before applying the method of this invention is to remove this stop. Once the stop is removed, a missile or pellet firing mechanism is positioned so that its barrel or barrels is or are directed up into the tube or tubes of the reactor, preferably so that when the pellet is fired, the pellet does not strike the insides of the tube or strikes the inside of the tube the minimum number of times before striking the particles packed into the tube. In most instances, the barrel is positioned so that it fires parallel to the sides of the tube, preferably parallel with a line through the center of the tube.

The end of the barrel through which the missile or pellet exits is preferably below the entrance to the bottom of the tube, i.e., so that the barrel does not project into the tube and impede the falling particles.

The positioning of the firing apparatus can be done by hand, i.e., a handheld, preferably an air pistol, for example, or by a remotely operated automatic apparatus capable of moving one or more barrels from one position to the next. The firing apparatus can be fixed to any part of the reactor, tube sheet, or even the tubes so that it fixes the barrel or barrels in a position that when fired, the pellet travels up into the tube and strikes the catalyst particles inside a tube or tubes.

Once the barrel or barrels are positioned, the apparatus is activated to fire at least one pellet up into the tube so as to strike the catalyst or particles inside the tube. The impact of the pellet with the particles packed in the tube, loosens or dislodges the particles and causes them to fall down the tube. The dislodged particles or some of the dislodged particles may fall down and out of tube or may fall a short distance inside the tube only to bridge or repack at a position below which it was impacted by the initial pellet. The firing of pellets is repeated in a tube until all or the desired amount of the catalyst has been dislodged and caused to fall out of the bottom end of the tube.

In a preferred embodiment of the invention, the firing apparatus is caused to fire bursts of missiles or pellets consisting of, at least two, preferably between about two (inclusive) and about six (inclusive) pellets. These bursts can be in a shot gun mode, i.e., simultaneous and random, or in the most preferred mode, a consecutive or pellet-by-pellet mode where there is an interval of space, i.e., time, between each of the pellets, in a burst or string.

The desired distance or time between the pellets within a single burst (string) ependsn on the characteristics of the tube and the particles. These characteristics determine the amount of particles that are dislodged by the initial impact and the distance the dislodged particles will fall before bridging within the tube. By firing bursts or strings of pellets, the falling particles are discouraged from bridging. A constant rapid string of pellets, as in a continuously fired machine gun, is inefficient and somewhat defeats the purpose in that it can impede their fall by promoting the bridging of the particles and even breaks up individual particles as they fall within the tube.

The preferred embodiment of the method is to fire repeated bursts or strings of pellets until the desired amount of catalyst has fallen out of the bottom of the tube.

The preferred time interval between pellets in a burst or string is between about 0.001 and about 0.006 seconds, most preferably between about 0.001 and about 0.002 seconds (depends on length of tube).

The preferred interval between bursts or strings is between about 1 and 4 seconds, most preferably between about 1 and about 1½ seconds (depends on length of tube).

The inside of a chemical or petroleum reactor is often an inhospitable place even without the added problem of falling particles. Usually a breathing apparatus is required to enter the reactor even when there is no problem of falling particles or dust. Besides the health problem it is desirable to remove the catalyst or particles from the reactor for either disposal or as in many cases for catalyst reactivation or regeneration, or where the metal used in the catalyst is expensive, recovery of the metal.

In a preferred embodiment of the method, the particles falling from a tube are caused to be collected, i.e., to fall into a means for collecting such as a bin. In a particularly preferred embodiment of the method, the particles falling from the tube are blown or vacuumed into a collection bin and then moved via air pressure or vacuum from the collection means, through a large tube into a storage means or bin, preferably outside the reactor.

The pellet firing apparatus has at least one barrel but preferably more than one barrel, i.e., between about 2 and about 14 barrels, inclusive, most preferably multiples of 5 or 7. It is most preferred that a pellet firing apparatus simultaneously fire all of its barrels or in groups of 5 or 7.

The pattern of tubes and the space between tubes within a reactor can vary from reactor to reactor and therefore it is necessary to match the pattern and the spacing of the barrels in a multi-barrel pellet firing apparatus to the pattern and spacing of the reactor tubes being emptied.

Figure 12:
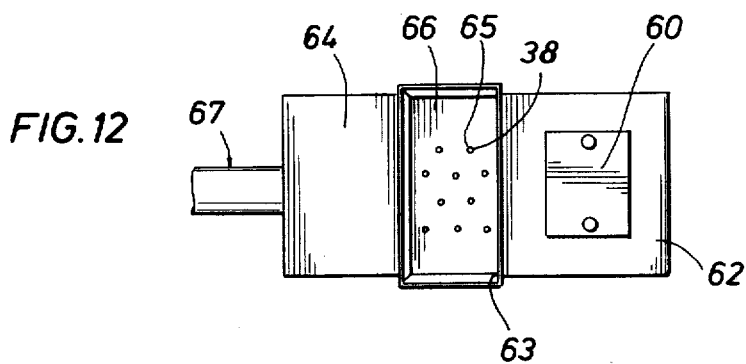
FIG. 12 is a top view of the tube emptying apparatus of FIG. 11, the missile bin and the particle collecting unit in the position for use.

The preferred pellet firing apparatus is one having seven barrels arranged with six of the barrels at the corners of a hexagon and the seventh barrel in the center of the hexagon. The most preferred pellet firing apparatus is one having 10 barrels arranged in alternate rows of 3 and 2, i.e., 3, 2, 3, 2, as shown in FIG. 12.

The pellet firing apparatus can be any apparatus capable of propelling a missile at a speed and to a distance sufficient to strike and dislodge particles within a tube. The pellet firing apparatus can be one that fires the pellet mechanically by striking the pellet, or by air pressure, or even by explosion. Common BB guns or air guns or pistols can be used in the method of the invention. However, the preferred pellet firing apparatus is one that has a constant source of gas pressure and fires the pellet by forcing the pellet through the barrel on a stream of gas. The gas used to operate the invention can be any dry clean gas (31 10° dew point; 5 m filter). The preferred gases are air and nitrogen, the most preferred is air.

The pellet can be made of any material but there are situations where it is preferable that the pellets do not contaminate the spent catalyst or particles being removed, for example, when certain metals might interfere in either the reactivation of the catalyst or in the recovery of the metal values. In such a case it is preferable to choose a non-interferring pellet. Thus, the pellet can be made of metal, plastic or catalyst or even catalyst carrier.

In another preferred embodiment of the invention, a means for indicating that the tube has been cleared is positioned in the reactor or on the apparatus so that time and shots are not wasted firing pellets into an empty tube or tubes. This means for indicating an empty tube can be an object that responds with a signal when hit by a pellet placed at the upper end of the tube. This signal could be a sound, a light, movement, or a change in shape or pressure.

In some instances it is possible to determine the number of bursts that are necessary to empty a tube and because the conditions are so consistent from tube to tube, to use this number of bursts for each of the tubes. In practice, it is usually necessary to inspect the reactor for other reasons (for example, to sand blast or clean the tube) and therefore possible and most efficient to individually empty the few tubes in a reactor that are not emptied by the predetermined fixed number of bursts or firings of the pellet apparatus. In some instances it is advantageous to cause gas to flow down the tube while firing into the tube to induce the particles to flow down the tube.

Since the barrel is in the path of the particles falling from the tube, it is necessary to minimize the amount of particles that fall into the barrel. This can be done by a number of protective means such as a protective cover over the end of the barrel, such as a flap or slit capable of allowing the pellet to pass upward but not allowing the particles falling from the tube to pass into the barrels. The preferred method of protecting the barrel from falling particles is to equip the barrel with a constant flow of gas flowing either upward through the barrel or through a space formed by a tube surrounding the barrel so as to push falling particles away from the open end of the barrel. The most preferred method is to have a low pressure gas stream constantly flowing directly up the barrel or barrels.

FIG. 1 describes a preferred apparatus for the method of emptying a tube. This apparatus is a gas assisted, gravity fed gas actuated pellet gun or tube emptying apparatus 10. The current practice for emptying a reactor is to have several men with metal tapes or wires in the bottom of a reactor with each man forcing the tape up a tube so that the particles inside the tube are caused to fall either into the bottom of the reactor or into a receptacle. Normally, this man or these men are wearing protective clothes and breathing apparatus. Even when the apparatus 10 is hand positioned and operated from within the reactor, it reduces the number of men needed, reduces the exposure of the men to dust and greatly reduces the time necessary to empty a tubular reactor. But, the method and apparatus of this invention can be remotely operated so that once setup at the bottom of the reactor, the apparatus may be automatically moved over the bottom of the regular pattern of tubes so as to be positioned under all or almost all of the tubes without having a man always inside the reactor.

Referring now to FIG. 1, the pellet firing tube emptying apparatus 10 has a gas source 11, usually a tank of compressed gas or compressor and a system 13 for controlling the delivery of gas to the loading and firing unit. The preferred gas is one that is inert under the emptying conditions, non-poisonous and inexpensive, for example, dry, clean air or nitrogen. The force used to propel the pellet will depend on the distance the pellet must travel and the force needed to strike and dislodge the object at which the apparatus is aimed, i.e., in the case of emptying a particular reactor, the distance to and force needed to dislodge the particles in a tube.

This compressed gas source 11 is equipped with a regular valve 12 to regulate the gas pressure delivered to the control and firing apparatus 13 through a tube 14, which is preferably a flexible tube 14. When the control and firing apparatus 13 is used as a reactor tube emptying apparatus, the regulator 12 is set to deliver between about 25 and about 350 psi gas pressure, preferably between about 150 to about 300 psi, and most preferably between about 175 to about 250 psi. The gas is led into the control and gas firing apparatus 13 through a high pressure line 15, optionally equipped with a relief valve 16 and/or a pressure indicator or gauge 17. The gauge 17 should be capable of responding to the incoming pressure range and the relief valve 16 should be set so as to protect the control mechanism 13. When the control mechanism 13 is part of a tube emptying apparatus, the relief valve 16 is set somewhere between about 100 and about 350 psi and the gauge 17 selected to read between 0 and about 350 psi.

The line 15 is connected to a quick exhaust or shuttle valve 19 through a three way normally open valve 18. The quick exhaust valve 19 is openly connected to a receiver, accumulator or surge pot 20. The quick exhaust valve 19 is connected, when open, through line 21 to the gas distributing pellet loading and firing mechanism or delivery unit 22 to be described below with reference to other figures.

The high pressure line 15 is divided and connected, prior to the connection with the valve 18, to a second regulator 23 which delivers gas at a reduced pressure, preferably at a pressure between about 1 and about 100 psi. Optionally, the second regulator 23 is connected through a low pressure line 24 to a pressure indicator or gauge 24 capable of reading 0 to about 100 psi gas pressure. Line 25 leads through an adjustable orifice, such as a needle valve 26, which is connected through purge and agitate line 27 to a check valve 28. The line 27 continues through the check valve 28 to connect with the gas distributing pellet loading and firing mechanism 22 so as to continually supply a stream of gas through the pellet loading portion to agitate the pellets and through the barrel to prevent anything from falling back down the barrel.

A second low pressure line 29, downstream of the second regulator 23, is connected to a two-way, normally closed valve 30, having a first actuator 31, preferably a push button actuator. This two-way, normally closed valve 30 is connected to a three-way, normally closed valve 32, having a second actuator 33, preferably a push button actuator and this valve 32 is connected to a two-way normally open pulse valve 34, the pulse valve being set to deliver a pulse of gas for a predetermined time. The length of time is determined by the average number of pellets one wants to fire in a single burst or string. The number of pellets depends upon the pressure and amount of gas supplied through the shuttle valve 19. The adjustable pulse valve 34 is preferably set for a pulse time of about 0.01 or less seconds. The pulse valve 34, is connected through line 29 to the third actuator 35 of the three-way normally open valve 18.

To operate the firing mechanism 22 one simply adjusts regulator 12 to deliver the desired gas pressure which in turn fills surge pot 20 and sends a low pressure stream of gas through the needle valve 26, which is adjusted to the desired level, to the delivery system 22 through the check valve 28. To fire a burst of pellets one just activates the first activator 31 which delivers a low pressure stream through valve 30 to valve 32. Then one activates the second activator 33 which sends a stream of low pressure gas to the normally open pulse valve 34 which delivers a timed pulse of low pressure air to activator 35 of the normally open valve 18, activating same so that the high pressure gas is diverted to the atmosphere, i.e., the pressure from the gas source on the shuttle valve is decreased opening the shuttle valve which is connected to the delivery unit 22 so that the gas in the surge pot 20 is vented through the delivery unit 22 picking up pellets and firing them. When the pre-set time has passed, the two way normally open pulse valve 34 closes, releasing activator 35, redirecting the gas through the line 15 closing the shuttle valve 19, connection 21 with the delivery unit 22, and refilling the surge pot 20, readying the apparatus 10 to be fired again.

A preferred embodiment of the apparatus of this invention is the single delivery unit 22 shown in FIG. 2. The delivery unit 22 comprises an entrance connection 36 connected to the shuttle valve 19 (not shown) through gas delivery tube or line 21, the particle purge air line 27 being preferably connected to gas delivery line 21. The entrance connection or gas conduit, bottom opening 36 is connected to the firing gas conduit 37 which runs into the firing/loading chamber 39 which opens to the bottom opening 52 of the barrel 38.

When uniform spherical missiles 40 are used the preferred diameter of the firing gas conduit 37 is about one half that of the missile 40, the preferred diameter of this type of chamber 39 and the barrel 38 is about 1.02 multiplied by the diameter of the missile 40. At the opposite end of the loading tube 41, there is missile delivery conduit 101 with a diameter equal to the diameter of loading tube 41. This missile delivery conduit 101 enters the loading tube 41 perpendicular to the loading tube 41 (or perpendicular to the ground when the missile loading tube 41 is sloping slightly downward into the chamber 39) at a position on the loading tube 41 such that the distance between the center of the missile delivery tube 101 and the end of the loading tube 41, not connected to the chamber 39, is about one missile diameter. The 0.4 missile diameter extension 80 ends with a deformable, resilient preferably adjustable plug or stop 81, preferably made of plastic, most preferably made of nylon. The plug 81 has a hole 82 running through it which has a diameter less than the diameter of the missile 40, preferably about one half of the diameter of the missile 40. This extension 80, plug 81 and its hole 82 form a missile check valve 42 which prevents the missile 40 from backing up in the loading tube 41, up the delivery tube 101, and into the bin 60 when the apparatus fires.

The delivery tube 101 open on the end opposite its connection to the loading tube 41 into a cylindrical funnel 83 which opens into the missile storage chamber or bin 60 (not shown). The sides of the funnel 83 slope downwardly and inwardly to meet the top of the missile delivery tube 101 at an angle of about 15 degrees (measured from vertical of), the funnel entrance 84 having a diameter about 4.5 times that of the diameter of the missiles.

The missile chamber or bin 60 is filled with uniform diameter spherical missiles which fill the funnel 83 through the funnel entrance 84 and enter the missile delivery tube 101 and then fill up the missile loading tube 41, usually by the force of gravity. While gravity is sufficient, it is advantageous to insure steady operation to supply a low pressure gas stream through the funnel opening 84 and/or the plug hole 82. The delivery unit 22 is fired by the burst of gas from line 21 entering the firing chamber 39 and forcing the missile in the chamber 39 up into and out of the barrel 38. While the missile is in the barrel 38 the string of missiles in the loading tube are forced back, the one missile nearest the delivery tube 101 is forced into the check valve 42 against the plug 81 shutting off the hole 82 thereby preventing any missiles from backing up into the tube 101. Once the missile 40 exits the barrel 39 a new missile 40 is drawn in by gas pressure (vacuum) within the firing chamber 39, then fired through the barrel 38.

The preferred length of the barrel 38 is between about 20 and about 60 times the diameter of the missile 40.

Another preferred embodiment of the delivery unit 22 is shown in FIGS. 3 and 4. The loading chamber 39 is a chamber formed by two plates, a loading chamber bottom 44 and a loading chamber top 47 which is suspended over the bottom 44 by support or suspension means 61, for example, posts. It is preferred that the bottom 44 forms the bottom of the missile bin 60 and the top 47 is smaller than the bottom 44 so that missiles or pellets (not shown) may move from about the chamber past the side of the top 47 between the top 47 and bottom 44, through the chamber side entrance opening 48 and into the chamber 39. In a preferred embodiment, in addition to the chamber side entrance opening 48, the chamber top 47 has at least one, preferably three, chamber top holes 49 allowing missiles to flow from the bin 60 into the chamber 39 through the top 47 via the chamber top holes or openings 49. The chamber side opening 48 is preferably about 1.2 missile diameter high while the diameter of the top opening 49 is some number between greater than one but never equal to a whole number times the diameter of the missile, most preferably between 3½ to 4 or between 4 and 4½ (not 4).

The delivery unit 22 of FIG. 3 is set in a bin 60 so that when the bin is filled with missiles the exit end of the barrel 38 extends beyond the missiles in the bin 60, preferably outside the bin 60 so that the bin 60 can have a top, and falling particles cannot get into the bin 60. The spherical missiles flow by gravity into the chamber 39, through the top opening 49 and side opening 48. The top gas conduit opening 45 of firing gas conduit 37 and the bottom opening 52 of the barrel 38 have their centers on the same straight line so that as a blast of gas passes through the firing gas conduit 37 and into the barrel 38, it draws missiles to and forces missiles up and through the barrel 38 propelling them up the reactor tube (not shown).

A particularly preferred delivery unit 22, which can be used to deliver a wide range of types of particles including the pellets used in the reactor tube unloading apparatus 10 is shon in FIGS. 5 and 6. This particularly unique loading chamber 39 is adaptable to load and elevate or deliver particles such as grain, sand, flour, gravel and the like, as well as the missiles or pellets used in the tube unloading apparatus 10. The loading chamber bottom 44 is connected to a continuous gas source or an intermittent gas source, such as the shuttle valve 19 of FIG. 1, via the firing gas conduit entrance opening 36. The barrel 38 and the loading chamber top 47 are suspended by support means which can, for example, be either posts between the top 47 and bottom 44 (as in FIG. 4), supporting the top 47 or supports connecting the sides of the bin 60 and side of the top 47 (as in FIGS. 5 and 6).

The gas conduit bottom opening 36 is connected to the firing gas conduit 37 which passes through the bottom 44 and has a firing gas conduit top opening 45 which opens into the loading and firing chamber 39 directly under the bottom barrel opening entrance 52. The gas conduit 37 and its top opening 45 form a nozzle 84 which extends above the floor 46 of the chamber bottom 44. The floor of the chamber 46 slopes uniformly downward at an angle of between about 3 and about 15 degrees, its lowest point being the entrance of the firing gas conduit top opening 45. A flexible bottom cover 50 stretches over the floor 46 of the chamber bottom 44, giving the chamber 39 an essentially horizontal floor. The flexible bottom cover 50 is made so that, at rest, it is stiff enough to maintain the essentially horizontal position essentially at the same level as the gas conduit top opening 45. It is usually made of rubber, plastic or thin sheet metal. The cover 50 has a cover opening 51 and the center of the firing gas conduit top opening 45, the cover opening 51, the barrel bottom opening 52 are all on the same perpendicular line.

When the apparatus is to be used for uniform spherical missiles, the minimum distance between the bottom of the top 47 and the cover at rest is slightly larger than the diameter of a missile, about 1.2 to 1.5 diameters. When the blast of the gas moves through the firing gas conduit 37, the gas conduit top opening 45, cover opening 51 and bottom barrel opening 52, a vacuum is created between the cover 50 and the chamber bottom floor 46, causing the cover 50 to flex downward which causes the missiles or particles to move downward, in the newly created cavity, toward the firing gas conduit opening 45, insuring that there are missiles or particles (not shown) in a position to be loaded into the barrel 38. When the barrel 38 is loaded with a missile or with a slug of particles, a back pressure is built up forcing gas flow through the cover release barrel side conduit 87 through the cover release line 88 which connects to the cover release check valve 89, then through a line 90 which affords open communication with the cover release bottom conduit 91 which allows open communication into the chamber 39 beneath the cover 50. (The check valve is adjusted depending on the gas pressure and the particle type.) The vacuum abates and forces the cover 50 upward and if flexible enough the cover will form a seal against the edge of the bottom barrel opening 52, thereby increasing the efficiency by insuring that all of the gas goes up the barrel 38 to force the missile or particle up and out of the barrel or delivery tube 38. When the missile or slug of particles exits the barrel or delivery tube 38, the vacuum below the cover 50 will be recreated and the cover 50 will be deflected downward to cause the particles or missiles to move toward the firing gas conduit top opening 45.

In a preferred embodiment, particularly preferred when nonuniform particles are used, i.e., when slugs of material pass upward through the barrel or delivery tube 38, the firing conduit 37 has an extension nozzle 84, extending above the chamber bottom floor 46, just above the level of the cover 50 when at rest, the edges of the cover opening 41 form a cover lip 85 (also made of flexible material) which extend upward and the bottom of the barrel 86 slopes inward at an angle of between about 5 and about 20 degrees so that the opening 52 is smaller than the barrel conduit 43. The lip 85 insures good contact with the edge of the opening 52, helps prevent particles from getting under the cover 50, while the extension nozzle 84 insures initial vacuum. The movement of the cover 50 prevents bridging and moves missiles and/or particles into the loading position in the loading chamber 39.

The cover 50 is preferably sealingly attached to the chamber bottom so as to not interfere with the movement of missiles or particles, preferably outside the bin 60 as shown in FIG. 6.

The particles or missiles (not shown) to be loaded and delivered are placed in the space or bin 60 above the top of the chamber 47, so that by gravity feed they enter the chamber 39 through the opening 48. The particles rest on the flexible bottom cover or diaphragm 50. When a pulse of gas is forced through the gas conduit 37, opening 45 and 41 and up through the barrel conduit 43, a vacuum is forced under the diaphragm 50 in the space between the diaphragm 50 and the bottom 44 causing the diaphragm 50 to be deflected downward around the opening 45, agitating the particles or (BB's) and causing them to flow toward the opening 45. At the same time the pellets or particles are forced up and out of the conduit or barrel 38, the cover 50 is forced upward, with the assistance of the back pressure check valve 89 which delivers gas under the cover 50 as pressure builds in the barrel 38, to close against the edge of the opening 52. Repeated firing or pulsing insures good movement of the cover and the particles and good feeding of the delivery unit 22.

When the particle is the uniform spherical pellet or BB, one is faced with a difficult problem of bridging of the missiles. To minimize the problem, the opening 48 into the side of the chamber 39 should be just slightly larger than the diameter of the BB and the opening 49 through the top of chamber 39 should be between 3½ to 4 or 4 to 4½ (not 4) diameters of the BB's and the diameter of the top 47 should be such that the circumference when expressed in pellets diameters is equal to some number of pellets plus ½ pellet.

The delivery unit 22 may be a multiple of the units shown in FIGS. 2 and 3 or a unit similar to FIG. 3 without the diaphragm 50 and/or the sloping floor 58, arranged in any desired pattern. The most preferred pattern is one that corresponds to the normal pattern of tubes in a reactor, i.e., 1⅜ inch triangular pitch. The preferred pattern is one where a barrel 38 is at each corner and the middle of a regular hexagon or some multiple of this. The most preferred pattern is one in which there is a series of barrels 38 in a three, two, three, two repeating pattern.

FIGS. 7, 8, 9 and 10 show a preferred delivery unit 22 having multiple barrels 38. Gas delivery line 21 connects to a gas distributor 79 which is a housing having a cavity 54 therein, the line 21 being in open communication with the gas distributor cavity 54. In addition, purge and agitation line 27 is in open communication with the cavity 54 or the gas delivery line 21. In a preferred embodiment, there are at least two, preferably seven most preferably ten gas distributor openings 55 through which pass tubes 56 in open communication with the cavity 54. The gas distribution tubes 56 are connected and communicating with the bottom 57 of the chamber bottom 44 of the loading chamber 39. These gas distribution tubes 56 lead into and communicate with a gas conduit 37 (not shown in these figures) which in turn communicate through gas conduit top opening 45 in the chamber bottom top 58 of the chamber bottom or floor 44. The diameter of the gas conduit top opening 45 is preferably smaller than the diameters of the spherical pellets 40 (not shown) to be used with this delivery apparatus 22. Suspended over the floor 44 by chamber support means 61 and connected thereto, each barrel 38 having a conduit running through its length with a barrel bottom opening 52 on the bottom 59 of the chamber top 47. Each barrel 38 is placed so that a line through the center of the gas conduit top opening 45, the barrel bottom opening 42 and the conduit 43 is a straight line and there is open communication there through. The means of connecting tubes and conduits to the parts of the apparatus is not critical as long as the connection is secure and allows the proper communication.

Because of the problem of bridging associated with the use of spherical pellets, it is preferred that the space between the floor 44 and top 47 of the chamber 39 be slightly larger than the diameter of the pellet, about 1¼ times the diameter of the pellet.

The chamber top 47 can have chamber top missile openings 49 affording open communication though the chamber top 47. The space 60 above the floor 44 and top 47 around the barrels 38 is the excess missile storage space or bin 60. Thus BB's or missiles are poured into the bin covering the top 47 and floor 44, forced into the chamber 39 through the chamber side opening 48 and through the chamber top opening 49.

In a preferred embodiment of the invention shown in FIG. 9, the top view of the bottom 44 and FIG. 10, the top view of the top 47 the chamber suspension means 61 acts as missile flow promoter means inside the chamber 39. These flow promoter means 61 can serve to support or suspend the top 47 over the floor 44. The placement of the flow promoter means 61 and the opening 49 is important and best results are obtained when the flow promoter means 61 are placed so as to be tangent to the gas conduit center opening 45 equal distance between alternate two openings 45 on the outside of the hexagon, 120° apart as in FIG. 9. The missile chamber top openings 49 are placed between alternate two openings 45, 120° apart, the outer edge tangent with a line drawn tangent to the outer edge of the barrels 38. Another preferred placement of the flow promoter means 61 is to have three flow promoters/supports means 61, each being of a length equal to the distance between the center of two adjacent barrels 38, the inner edge placed on the line tangent to the outer edge of two adjacent barrels 39 as in FIG. 10.

Figure 11:
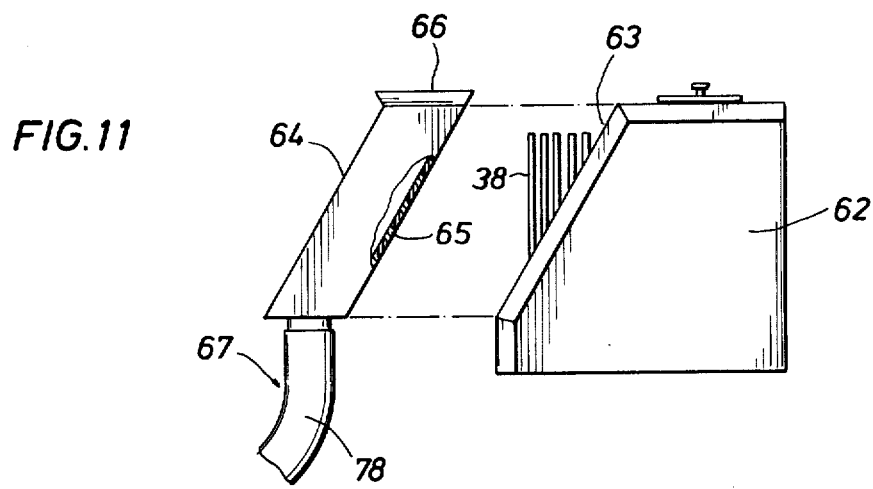
FIG. 11 is a side view of a tube emptying apparatus, the missile bin and delivery unit shown separated from the particle collecting unit.

FIGS. 11 and 12 show a preferred embodiment of the tube emptying apparatus 10. When a man is not to be placed inside the reactor, this embodiment may be the gas firing mechanism 13 (see FIG. 1 for example) or just the delivery unit 22 or all of the parts except valve activators 31 and 33.

The pellet or missile bin and loading chamber housing 62 has a slanted side 63, sloped from the bottom toward the opposite side of the housing 62 and the barrels 38 protrude through this sloped side. The tube unloading apparatus has a particle catching or catalyst collection means 64 which fits over the barrels 38 so that the barrels 38 protrude through holes 65 in the side of the particle catching means 64, into the particle receiving opening 66 of the particle catching means 64. The particle catching device 64 is equipped with a vacuum means 67 for collecting and transporting the dislodged particles or catalyst which fall or are drawn into the collector 64. The vacuum line 78 is preferably flexible to accomodate the movement of the unit 22. The bin 60 and chamber housing 62 and its attached particle catching means 64 are positioned so that the barrels 38 are directly below a number, preferably ten tubes, the system having been readied by supplying gas to line 15 thereby filling surge pot 20 and supplying a steady low pressure flow of gas through line 27 into the distributor 79 and through each barrel 38. Activator 1 and 2 are depressed in order causing the shuttle valve 19 to empty the surge pot 20 through the distributor 70 through the loading chamber 39 and out the barrels 38. This burst of gas, draws and forces missiles one at a time rapidly in and fires them out of the barrels 38 into the tubes. The loading chamber 39 is kept filled with BB's which move by gravity into the chamber side opening 48 and chamber top opening 49 from the bin 60.

It is possible to fire a certain number of bursts of missiles, each burst having 2 to 7, preferably 3 to 5 missiles per burst, and to inspect to see if the tubes are free of particles. Once the average number of bursts needed to empty or nearly empty the tubes is determined, then one can follow a program of moving the tube empty device to the adjacent set of tubes after firing the pre-determined number of bursts. This procedure greatly reduced the time needed to empty a reactor. Any tubes not completely emptied can be manually finished with the usual tapes or perhaps forced out from the top of the reactor.

Figure 13:
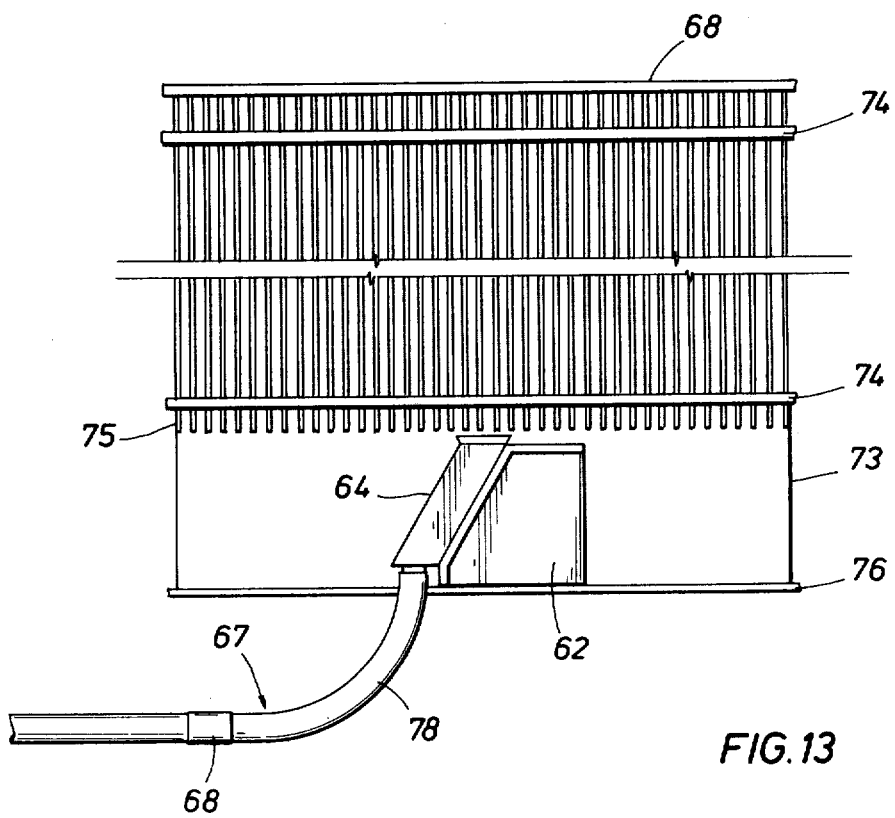
FIG. 13 is a side view of a foreshorten reactor showing the tube emptying apparatus in place and ready for use.

Another approach to determining when a set of tubes is empty is to attach a means of indicating that a tube is empty 68 such as an indicator on the vacuum system 67 to show no more particles are being collected, or a pressure drop indicator to show that there is free flow of gas through the tubes being fired into, or an impact indicator at the opening in the top of the tubes which would indicate when it has been hit (it would take the form of seven (where the barrel number was seven) circuit breakers each of which would close on impact of a BB until a circuit was complete and air or electricity would flow to an activator such as a light, sound or level and/or to signal the apparatus 10 or a man to move on to a new set of tubes). The indicator means 68 could be as simple as a protective sheet of material over the top of the tubes which would show dents or make sound when it was hit by missiles. Two of these means of indicating are shown in FIG. 13, as 68, as a site glass 68 in the vacuum line and a cover 68 over the top of the tubes which would show dents or make sound as an empty tube indicator. The tube cover indicator 68 also forms a means to protect personnel working around the top of the reactor.

Figure 14:
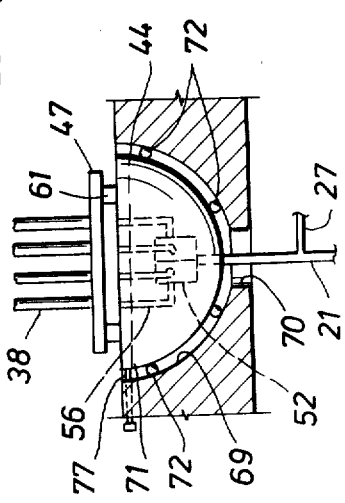
FIG. 14 shows side view, bisected embodiment of the delivery unit, set on ball bearings within a cup in order to achieve easy leveling.

One of the most difficult problems associated with the pellet delivery system 22 is to maintain a steady flow of BB's from the bin 60 into the loading chamber 39 and up the barrel 38. As with any uniform spheres there is a tendency for the BB's 40 to bridge and block flow. One way of minimizing this tendency is to make sure that all of the dimension that the BB encounter, such as the diameter of the bin, the distance between the barrels, the top of the floor 58, the top of the chamber 44, openings 48 and 49 are not exact or nearly exact multiples of the diameter of the BB's. (Commercial BB's usually range between about 0.172 inches and about 0.178 inches with 97% falling between about 0.174 and about 0.176 inches in diameter.) The BB feeding problem is aggravated by failing to have the floor 44 of the firing unit 22 level. This is somewhat overcome when one uses the cover 50 arrangement as in FIGS. 5 and 6 or a series of covers 50 for a multi-barrel firing unit 22 (as would be needed for FIG. 7) but it can also be minimized by floating the firing unit 22 in a cavity 69 as shown in FIG. 14 which is preferably a hemisphere. The bottom of the hemisphere 69 has an opening 70 through which gas conduit lines 21 and purge lines 27, which are flexible, are connected to distributor 52. The floor 44, and the distributor 52 are housed in hemisphere 71 which floats on ball bearings 72 in the cavity 69.

Referring to FIG. 14, the tube empty apparatus 13 is attached to the reactor 73 and/or the tube sheet 74 and/or the tubes 75 by an attachment means shown as 76, which serves to support and guide the apparatus and can have rails over which the apparatus is moved and guided. Through uniform force of the BB's 40 on the top of the floor 44 or by external force (even manually) the floor is forced into a level position and locked there by a means for locking the hemisphere in place 77, such as a set screw, before beginning to fire the apparatus.

When the distributor 79 is shaped as shown in FIGS. 1, 7 and 8 and the line 21 and/or 27 enter the distributor cavity 54 substantially opposite a particular hole 55, it is necessary to reduce the diameter of the opposite line 56 and/or that opposite opening 45 to ensure that all barrels 38 receive the same amount of gas from the surge pot 20 on firing.

FIGS. 11 and 12 in combination with FIGS. 15 and 16 illustrate a particularly preferred embodiment of the invention. The missile delivery unit 62 houses the missile delivery means 22 shown only by the barrels 38 and the external portion of the bin 60. It is possible, but not necessary, that this delivery unit 62 houses a gas delivery and control unit 13 or such unit 13 could be external to the housing 62. The dislodged particle collector or recepticle 64 fits over the barrels 38 so that the barrels 38 are inside the collector 64 and point out the collector top opening 66. When one has a dust problem and wishes to minimize dust formation it is preferred that the collector top opening be lined with a rubber material so that there is a tight fit between the collector 64 and the bottom of the tubes 75 thereby preventing the escape of dust.

At the bottom of the particle collector 64 is collector bottom opening which is preferably attached to the particle vacuum means which draws the dislodged particles which fall into the collector 64 away from the collector 64 through a particle vacuum tube 67 to a desired position (preferably outside the reactor).

The housing 62 and its attached collector 64 are preferably resting on a missile delivery unit support rack 92 which is attached to the reactor by a rack attachment means 93 preferably a means which is inserted into and attached to the tubes 75 at the corners of a rectangle.

The missile delivery unit support rack 92 is made up of a first set of two parallel cart rails 94, a tray support cart 95 and a delivery unit support tray 96.

The carts rails 94 are attached beneath the tube bottoms by the rack attachment means 93.

The tray support cart 95 is made of two parallel tray rails 97 which run perpendicular to the cart rails 94. The ends of the tray rails 97 are attached to two cart sides 98 and each cart side 98 has two cart wheels 99. Each cart wheel 99 forms a pair with its opposite cart wheel 99 on the opposite cart side 98 and a pair of cart wheels 99 are attached to a cart axle 100. A pair of cart wheels 99 and the attached axle 100 perferably rotate together. The cart wheels 99 are adapted to rest on and roll over the cart rails 94 so as to move the cart 95 parallel to the cart rails 94.

The delivery unit support tray 96 is made up of a tray 101 with a first pair of trays wheels 102 attached on each side of one end of the tray 101. This first pair of tray wheels 102 are adapted to rest on and roll over the two tray rails 97. The other end of the tray is equipped wit a tray wheel attachment means 103 which is adapted to receive and attach to the detachable tray axle means 104. The second pair of tray wheels 105 are attached to the two ends of the tray axle means 104 and adapted so as to rest on and roll on the tray rails 97.

When the missile delivery unit support rack 92 is in firing position, the tray axle means 104 is attached to the tray wheel attachment means 103 and the delivery unit rests on the tray in such a manner that when the tray axle means 104 is detached from the tray 101 and the wheelless end of the tray 101 dropped down one has room and access to the missile bin 60 and can replenish the bin 60 easily without removing the support rack 92 or the housing 62. Once filled, the tray 101 is swung into place and the tray axle 104 reattached to the tray 101.

The support rack 92 allows movement across the bottom of the tubes 75 on the cart wheels 99 parallel to the cart rails 94 by moving the cart 95 and perpendicular to the cart rails 94 by moving the tray 101 on its wheels 102 and 105 over the tray rails 97. This allows one to empty a large number of tubes for each support rack 92 placement.

In FIG. 16 the tray axle attachment means 103 is a slot adapted to receive the tray axle 104 which is a bar adapted to slide into the slot and there is an axle lock means 106 which in FIG. 16 is a set of pin hols 107 through which lock pins 108 may be inserted to hold down axle 104 in place. These pins 108 are removed to withdraw the axle 104.

The cart 95 may be moved in one direction while the tray 96 may be moved in the same plane in a direction perpendicular to that of the cart 95. When one wants to fill the bin 60 with missiles one removes the tray lock means 106, slides the detachable tray axle 104 away from the tray 96 and tilts the tray with the housing 64 so that one has access to the bin 60 and fills it with missiles 40.

We claim as our invention:

1. A method of removing bridged particles from a tube having a bottom entrance which comprises:
   (a) positioning a missle firing means separate from and below the bottom entrance of a tube containing bridged particles so that a missile, when fired, will enter the bottom entrance of the tube and travel up the inside of the tube essentially parallel to the sides of the tube;
   (b) activating the missile firing means so that it fires at least one missile into the bottom entrance of the tube with enough force to travel up the tube, strike and dislodge at least some of the particles, causing the dislodged particles to fall down the tube; and
   (c) repeating step b until the desired amount of the particles in the tube have fallen down and out of the bottom entrance of the tube.

2. The method of claim 1, where, when activated, the missile firing means fires bursts of missiles.

3. The method of claim 2 where the burst of missiles is a string of missiles.

4. The method of claim 3 where each string contains between about two and about six missiles, inclusive.

5. The method of claim 4 where the missile firing means has more than one barrel, each barrel being positioned so as to fire into a different tube.

6. The method of claim 5 where the number of barrels is ten.

7. The method of claims 1, 3 or 5 which includes collecting the dislodged particles in a particle receiving means positioned, under the tube, to receive the particles which fall out of the tube.

8. The method of claim 7 which includes moving the collected particle out of the receiving means by attaching a vacuum tube means to the particle receiving means to move the particles from the receiving means to a remote location.

9. The method of claim 1, 3 or 5 which includes forcing a stream of gas down the tube to induce movement of the particles down the tube once dislodged by the missile.

10. The method of claim 1, 3 or 5 where the missiles are made from a material selected from the group consisting of metals, plastics, catalyst and catalyst support.

* * * * *